Aug. 28, 1962

N. HAGEN 3,050,773

PROCESS AND APPARATUS FOR MANUFACTURING BLOWN ARTICLES

Filed July 14, 1959

INVENTOR
Norbert Hagen
BY

Aug. 28, 1962    N. HAGEN    3,050,773
PROCESS AND APPARATUS FOR MANUFACTURING BLOWN ARTICLES
Filed July 14, 1959    5 Sheets-Sheet 2

INVENTOR
Norbert Hagen
BY

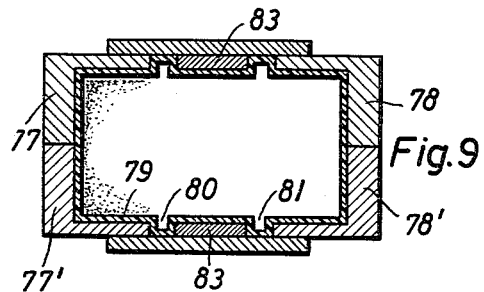
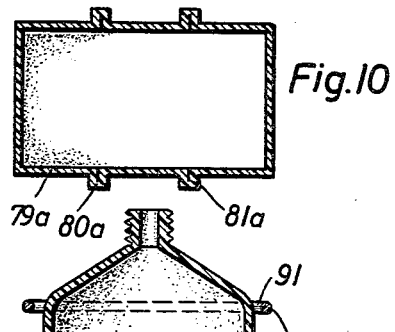
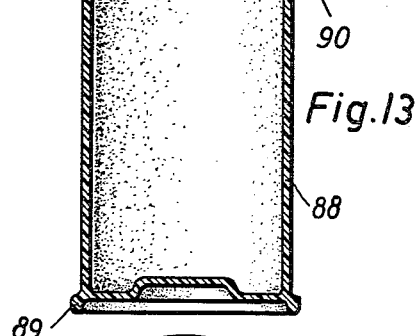
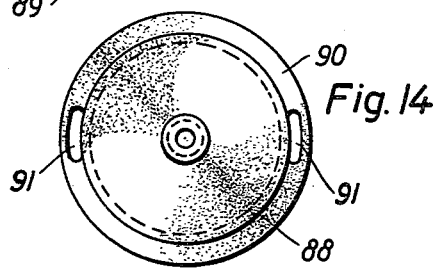
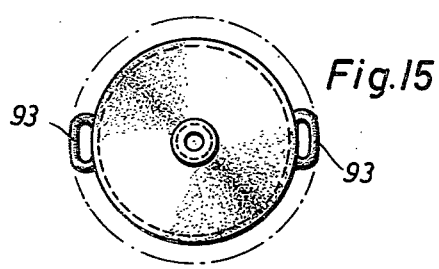
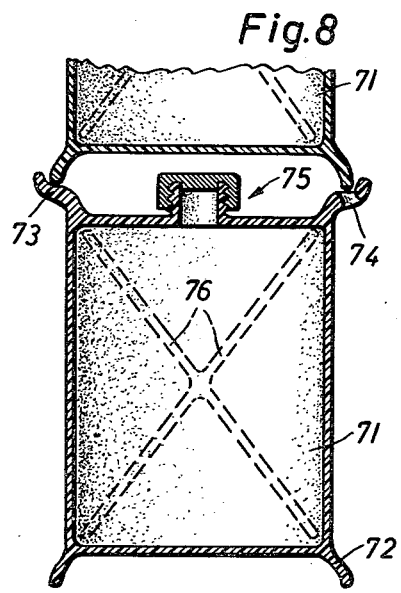
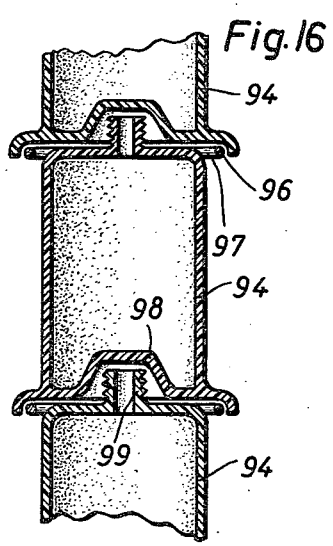

Aug. 28, 1962  N. HAGEN  3,050,773
PROCESS AND APPARATUS FOR MANUFACTURING BLOWN ARTICLES
Filed July 14, 1959  5 Sheets-Sheet 5

INVENTOR
Norbert Hagen
BY

United States Patent Office 3,050,773
Patented Aug. 28, 1962

3,050,773
PROCESS AND APPARATUS FOR MANUFACTURING BLOWN ARTICLES
Norbert Hagen, Siegburg, Rhineland, Germany, assignor to Reinold Hagen, Hangelar, uber Siegburg, Germany
Filed July 14, 1959, Ser. No. 827,005
Claims priority, application Germany July 26, 1958
8 Claims. (Cl. 18—5)

This invention relates to hollow plastic articles and their manufacture. More particularly, it is concerned with an apparatus and a process for making such articles by blowing, and with the blown articles themselves.

For the purpose of my present invention, any plastic material may be used which is capable of becoming softened and plastic when heated at relatively low temperatures and which, while soft and plastic, may be expanded under fluid pressure into articles of desired shapes.

In producing hollow articles, such as, for instance, bottles, from plastics by blowing, an open-ended tube may be extruded from an annular extrusion nozzle which is mounted above a sectional mold into the space between the open sections of the mold to have the leading end of the tube slip over a so-called blow pipe which projects into the open mold space from opposite the extrusion direction and in alignment with the extruded tube. As soon as a sufficient length of the open-ended tube is extruded, the mold sections are closed over a segment of the tube, which causes the latter to be pinched shut by the mold sections near the nozzle. At the end of the tubing remote from the nozzle, the material is pressed against and around the blow pipe. The blow pipe serves to admit compressed air or any other fluid pressure medium into the closed tubing segment within the mold and to act at the same time as a core to form an opening in the article being produced. The fluid pressure medium admitted through the blow pipe expands the mold-enclosed tubing segment against the cavity provided in the mold. The molded article, upon cooling and when sufficiently resistant to deformation, is withdrawn from the opened mold.

If, for instance, a closed-ended bubble is extruded into the space between open mold sections, with a view to inflating such bubble, a blow pipe is used which pierces the bubble and then serves to admit fluid pressure and to form an opening which will appear in the finished article.

The present invention is also fully applicable to a principle of blowing, whereby no blow pipe is used but a hollow needle, as shown, for instance, in the Patent 2,515,093 to E. E. Mills, dated July 11, 1950. According to this patent, fluid for inflating purposes is forced into an inflatable product through a hollow needle.

Hollow articles made by blowing according to known methods and with the use of known apparatus have the great disadvantage of being unstable. This is especially true as far as small containers are concerned, for instance, bottles. Lack of stability makes itself felt in a very troublesome manner when small bottles as are used in the pharmaceutical and cosmetic industries are required to travel on conveyor belts through automatic filling, closing, and cleaning apparatus. Accordingly, it is an important object of my present invention to overcome the referred to disadvantage and to make stable hollow articles such as could not be made so far by blowing.

In blowing hollow articles, whereby an inflatable product within a mold is blown into contact with a cavity-defining wall, it will readily be appreciated that such wall portions of the blown or final article as were subject during the expansion to greater stretching than other portions become thinner. Such thinner and necessarily weaker sections of a final article result from the prior methods and apparatus and constitute another disadvantage. Thinned out and weaker areas are especially undesirable when they occur in places, as is often the case, which, during the use of the final article, are exposed to relatively great strains. For instance, an area which experiences relatively great stretching is the one between bottom and main body of a bottle, and it is the same area on the finished bottle that is subject to great stress. Thus, it is another object of this invention to overcome also this disadvantage, to make the production of blown hollow articles independent from such naturally occurring stretching actions, and to make it possible to produce articles free of undesirably weakened thinner areas.

Up to now, in order to stay within the necessary limits, the wall thickness of the initial plastic material from which one starts has been selected so that the most stretched wall area of the final article will be of sufficient thickness and strength. It will be obvious that the final article, when starting with overdimensioned initial plastic material, will be overdimensioned in such areas as are subject to no or less stretching during the blowing procedure and to little strain during use. A bottle, for instance, that is of appropriate thickness in the area between bottom and main body, an area of great strain, will ordinarily be too thick in areas of no or little strain. Such designing amounts to a waste in material and is uneconomical. My invention aims at doing away with such lack in economy, one object of the invention being to start with such thin initial plastic material as will correspond to the areas of no strain on the final product, while areas of greater or great strain will be locally strengthened.

Generally speaking, the primary object of the present invention is to form hollow plastic articles by blowing and to provide blown articles, in one and the same operation, with strengthening formations, such as ledges, beads, ribs, and such other formations, for instance, flattened portions, sealing surfaces, etc., as could not be obtained so far, when making hollow plastic articles by blowing.

Basically, the foregoing and such other objects of the invention as will be apparent from the following description are achieved by providing that an intermediate product be blown, rather than the final article, and that the intermediate product be converted into the final article. The intermediate product is made from an embryo or inflatable product which is closed except for an opening through which a blow pipe, a hollow needle, or the like passes. Thus, the intermediate product will also be closed, with the exception of the referred to opening. The present invention offers the solution to the problem of how to make in a single operation from an intermediate product the final article that is shaped so that it could not be made directly by blowing but can be arrived at by reshaping the intermediate product.

I employ, according to the invention, a sectional mold, which, when in blowing position, defines at least a single composite cavity conforming in shape to an intermediate, not the final product. The cavity and, therefore, the intermediate product to be blown therein have at least a single dilated portion. The mold includes at least a single pair of sections and at least a single part, whereby the sections are mounted to be moved horizontally toward and away from each other. At least one of the mold sections and the mold part are mounted to be relatively movable at least toward and from each other in any direction. The mold sections and mold part are adapted to form the initial plastic material used, on closing the mold, at least a single embryo or inflatable product within the mold. There is an opening in the closed mold, and, for instance, a blow pipe passes through said opening to admit any suitable pressure medium to expand the inflatable product to the intermediate product. At least one of the mold sections and the mold part are shaped so as to press, on moving toward each other, portions of the intermediate product upon each other, thereby forming the final article having the desired shape and being, for instance, provided with strengthening flanges, ribs, or other formations nonobtainable merely by blowing. The desired flanges, ribs, etc. appear where there was no such formation in the intermediate product.

The present invention provides that sections of a sectional mold, which are movable with respect to each other, do the converting, when being moved toward each other, in the region of the dilated portion or portions of the intermediate product.

The specification is accompanied by drawings in which.

Figures 11, 12:
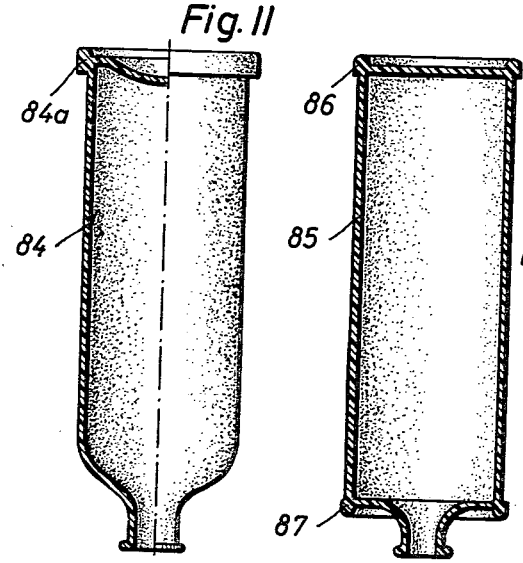
Figure 7:
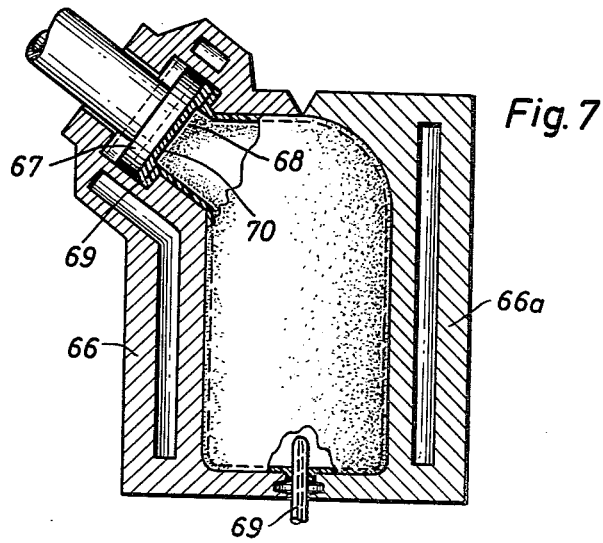
Figure 5:
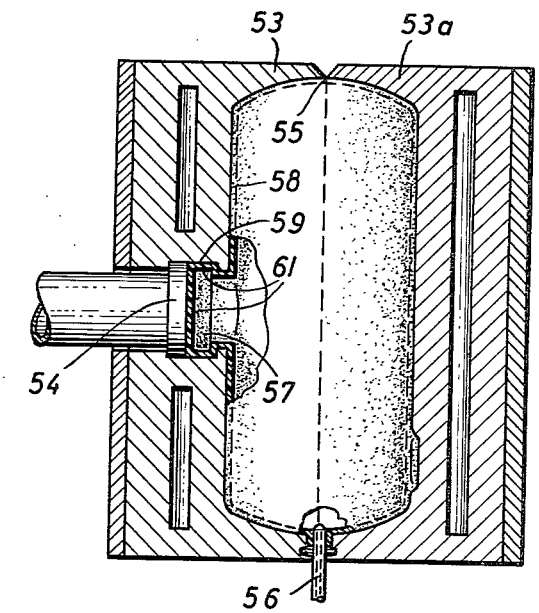
FIG. 5 shows, in vertical section, a further mold modification and an intermediate product within the closed mold.
Figure 6:
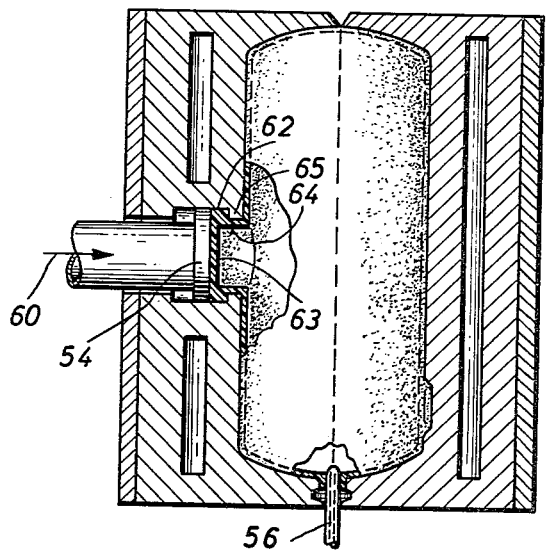
Figure 17:
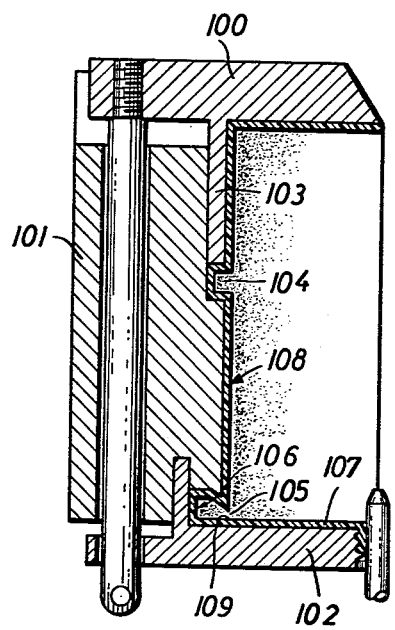
Figure 18:
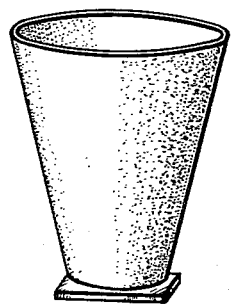

FIG. 6. shows the mold of FIG. 5 in another condition and the final article obtained from the intermediate product of FIG. 5;

FIG. 7 is a vertical section through a further modification of the mold according to the invention;

FIG. 8 is a vertical section through two containers of the invention, one being placed upon the other;

FIG. 9 is a horizontal section through still another modification of a mold of the invention;

FIG. 10 is a horizontal section through the final article obtained with the aid of the mold of FIG. 9;

FIG. 11 is a partially sectioned view of a container of, and made according to, the invention;

FIG. 12 is a longitudinal section through another container of the invention;

FIG. 13 is a longitudinal section through still another container of the invention;

FIG. 14 is a plan view of the container of FIG. 13;

FIG. 15 is a plan view of a modified container;

FIG. 16 shows, in a vertical section, containers of the invention in a stacked condition;

FIG. 17 is a fragmentary vertical section through a modification of a modified mold; and FIG. 18 is a perspective view of an article of the invention.

Figure 1:
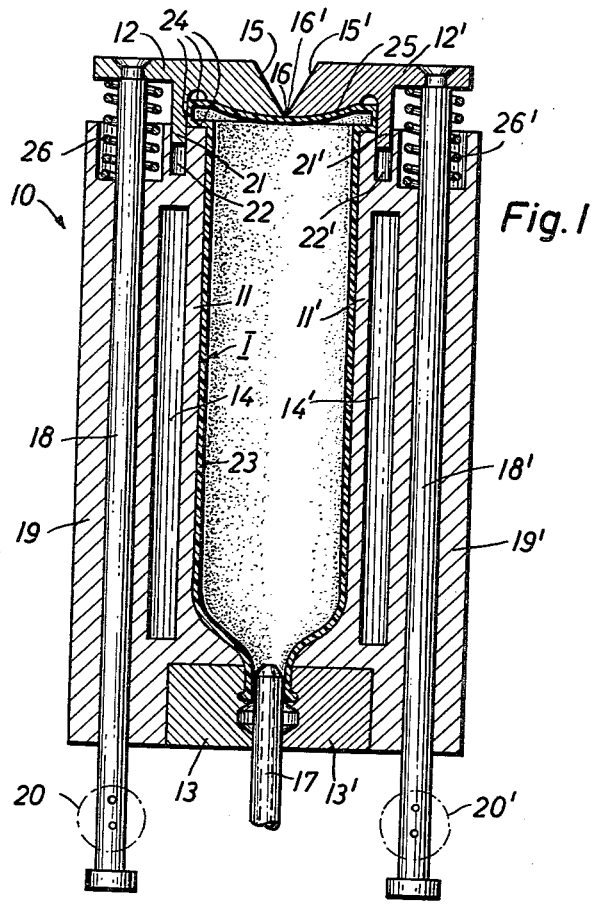
FIG. 1 is a vertical section through a mold embodying features of the present invention, also showing a blown or intermediate product lying against the cavity wall of the closed mold.
Figure 2:
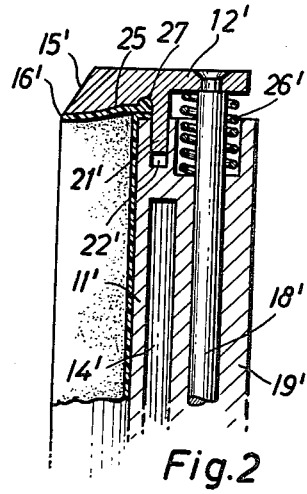
FIG. 2 is a fragmentary vertical section through one half of the mold of FIG. 1, illustrating a condition assumed subsequently to that shown in FIG. 1, and indicating the final article obtained from the intermediate product of FIG. 1.

Referring to the drawings in greater detail, and initially to FIGS. 1 and 2, a mold generally designated 10 to form a plastic container in the form of a bottle consists substantially of three pairs of sections, namely, 11, 11'; 12, 12'; and 13, 13', these sections being shown in closed position. The six mold sections complete each other to define interiorly a composite cavity corresponding in shape to an intermediate product which is between an embryo or inflatable product and the bottle or final article to be made. The sections 11, 11' are shown to be provided with fluid chambers 14, 14' to cool the temperature of the mold.

With the mold in open condition (not shown), that is, with the sections 11, 12 and 13 separated from the sections 11', 12' and 13', it is possible to extrude plastic material from an extrusion nozzle (not shown) above the mold to suspend vertically into the open mold space. If the extrusion nozzle has an annular outlet orifice, material of tubular shape is extruded. As soon as the required length of tubing is extruded, the mold sections 11, 11'; 12, 12'; and 13, 13' are moved horizontally toward each other to be closed.

The upper surfaces of the mold sections 12, 12' are beveled at 15, 15' to form sharp edges at 16, 16' to pinch, for instance, extruded tubing at 16, 16', when the mold is being closed, and thus to seal the segment of the tubing enclosed within the mold. The sections 13, 13' press-mold a portion of the extruded tubing at the free end of the latter against and around a blow pipe 17 which enters the cavity from below, in alignment with the extrusion direction, and is provided to admit fluid pressure to the fully enclosed tubing segment within the closed mold. The blow pipe 17 and the sections 11, 11' and 13, 13' cooperate to form the neck of the bottle.

The sections 12, 12' in addition to being movable from and toward each other, as the sections 11, 11' and 13, 13' are, are also movable relative to the mold sections 11, 11' in the direction of the vertical axis of the mold. In FIG. 1, the sections 12 and 12' are shown in the blowing position, with the intermediate product I having been blown, which position is assumed by the sections 12, 12' upon closing of the mold.

There are tie rods 18, 18' which are slidingly guided in lateral extensions 19, 19' of the mold sections 11, 11'. The tie rods are connected with the mold sections 12, 12' to impart to the latter a movement toward the mold sections 11, 11' and are actuated by any suitable means, such as eccentrics 20, 20' or levers, the latter being not shown. They may also be pneumatically or hydraulically operated. The sections 12, 12' are provided, for their proper guidance, with downwardly directed curved walls 21, 21' which are matingly received in depressions 22, 22' in the mold sections 11, 11'.

Upon the closing of the mold, fluid pressure, for instance, compressed air, is admitted through the blow pipe 17. The tubing segment which constitutes the "embryo" product is expanded to the interior shape of the closed mold. The product thus formed is an intermediate product which, as has been stated, is shown in FIG. 1 and which consists of the main body 23, a dilated portion 24 and a bottom portion 25.

It is now that the mold sections 12, 12' are pulled from their normal or blowing positions, by means of the tie rods 14, 14' and against the action of return springs 26, 26', downwardly or toward the sections 11, 11' to assume positions corresponding to that indicated in FIG. 2, as far as the mold section 12' is concerned. Due to the fact that the embryo or inflatable product has been expanded also to the interior shape of the dilated portion 24, the mold sections 12, 12', as they move into the positions indicated in FIG. 2 press the material constituting the dilated portion together to form an annular massive beadlike formation 27 at the bottom of the final article.

The shape and strength of the bottom bead depends, apart from the original thickness of the wall of the embryo article, on the magnitude of the pressure to which the U-shaped dilated portion 24 has been subjected. For instance, I may arrange for a pressure that will double the original wall thickness.

While the cooling of the intermediate product may be speeded up by a coolant flowing through the chambers 14, 14', it is important, when working according to my present invention, that the pressing movement of the mold sections 12, 12' takes place at a time at which the plastic material has not cooled and hardened too much. In case the pressing occurs too late, the wall portions which are pressed upon each other, would not be permanently welded together. Instead, the intermediate product would merely undergo a temporary deformation, so that the final article, upon the release of the pressure exerted, would reassume the shape of the intermediate product.

As soon as the pressing and welding is done, the springs 26, 26' return the mold sections 12, 12' to their normal positions shown in FIG. 1.

The mold is opened, and the bottle (final article) is ready to be discharged.

It should, of course, be understood that the work of the two pairs of sections 11, 11' and 13, 13' could be done by a single pair of sections as well. It will also be apparent that the present invention does not rely on an extruded open-ended tube to start with. While it is practical to start with freshly extruded plastic material, any extrusion shape that is suitable may be used, for instance, a bubble that is closed at its leading end, or sheet form whereby two sheets extruded in parallel relationship are formed into an inflatable product.

Figure 3:
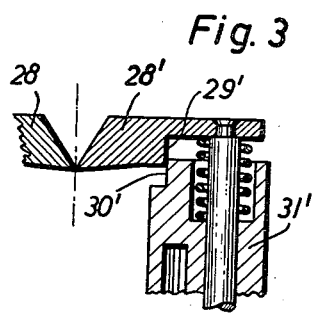
FIG. 3 is a fragmentary vertical section through a modified mold construction.

In the construction shown in FIG. 3, modified guiding means for the mold sections 28, 28' are used. These sections correspond to the sections 12, 12' of FIGS. 1 and 2 inasmuch as both pairs constitute mold bottom sections. The section 28' is shown to be provided with a shoulder 29', the complementary shoulder 29 being not shown, which shoulder 29' engages the offset surface 30' of the mold section 31'.

Figure 4:
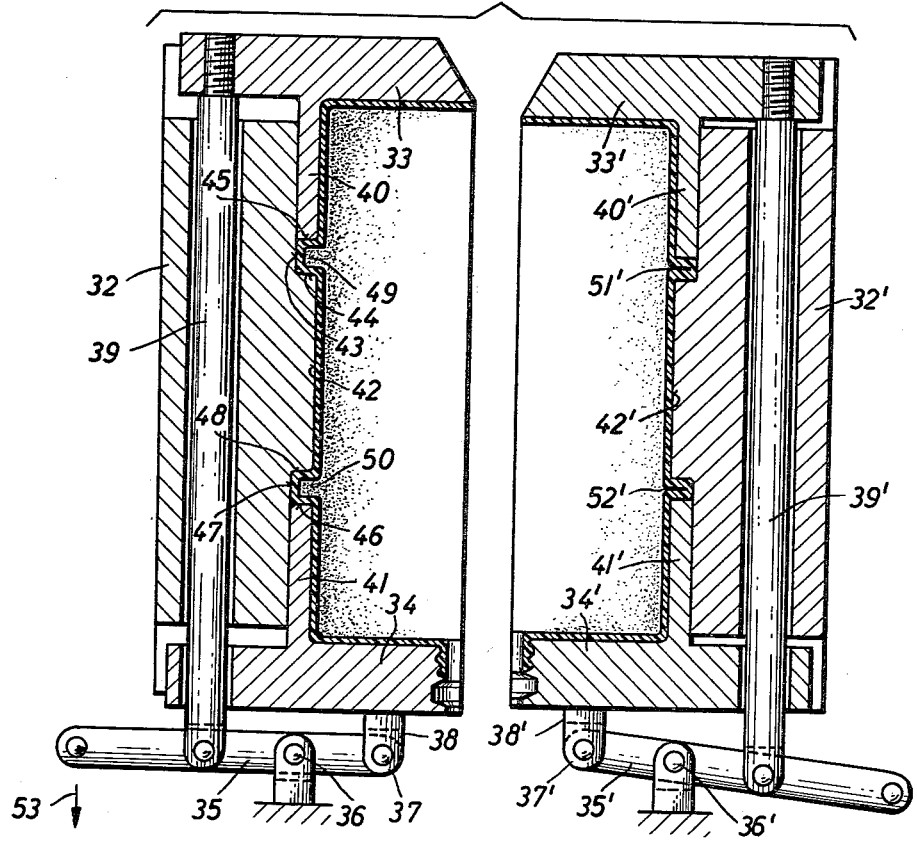
FIG. 4 is a vertical section through two complementary halves of another mold modification, the mold halves being shown in different positions, the intermediate product and the final article being shown in the left-hand and right-hand half of the view, respectively.

The mold shown in FIG. 4 in form of two separated halves consists of a pair of sections 32, 32', a pair of top sections 33, 33', and a pair of bottom sections 34, 34'. The top and bottom sections are longitudinally movable relative to the sections 32, 32'. The sections 33 and 34 are associated with a lever 35, and the sections 33' and 34' with a lever 35'. Each of the levers which is supported at 36 and 36', respectively, engages with its end 37 and 37', respectively, or over a member 38 and 38', respectively, one of the bottom sections 34, 34'. The top sections 33, 33' are connected to the levers 35, 35' by means of tie rods 39, 39' which pass through the mold sections 32, 32'. Both the top sections and the bottom sections are operated by the levers 35, 35' which act as two-armed levers to perform a longitudinal reciprocation.

The top sections 33, 33' are provided with extensions 40, 40' while the bottom sections are provided with extensions 41, 41'. These extensions are received and guided in matingly shaped cutouts provided in the inner walls of the sections 32, 32'.

The composite cavity which conforms in shape to the intermediate product to be blown within the mold of FIG. 4 is indicated in the left hand half of the figure. The wall defining the composite cavity is constituted by the portions 42, 42' of the interior walls of the mold sections 32, 32', the interior surfaces of the extensions 40, 40', 41, 41', and the wall portions 43, 44, 45 and 46, 47, 48, the complementary portions 43' to 48' being not shown. The wall portions 43 to 48 and 43' to 48' define two dilated portions 49 and 50, the complementary portions 50' and 51' being not shown either. The intermediate product is also indicated on the left-hand side and is shown to be provided with two dilated portions corresponding to 49 and 50.

On actuating the levers 35, 35' to move the sections 34, 34' upwardly, and the sections 33, 33' downwardly, the extensions press the plastic material of the dilated portions of the intermediate product against the faces 44 (44') and 48 (48') to weld such material together and to yield the final article which is indicated in the right-hand half of FIG. 4. The pressing takes place after blowing and before the material has cooled and has lost its plasticity. The material that was contained in the dilated portions of the intermediate product forms two annular ribs (51) 51' and (52) 52' on the final product. After the welding has been accomplished, the final article is allowed to cool in the mold, whereupon the mold is opened, and the article discharged.

Continuing to refer to FIG. 4, in order to convert the intermediate product into the final article, the levers 35, 35' are actuated in the direction of the arrow 53, whereby the levers and the mold sections assume the positions shown in the right-hand side of the figure. The mold is opened by a reverse movement of the levers 35, 35', causing the sections 33, 33' to move upwardly, and the sections 34, 34' downwardly, and by moving the sections of one side and the sections of the other side horizontally apart.

In FIG. 4, the dilated portions 49 (49') and 50 (50') and the ribs (51) 51' and (52) 52' are shown to extend horizontally, that is, circularly. It will be understood that differently extending and shaped dilated portions and ribs may be provided as well, for instance, ribs of any curved or any other design, such, as, wavy courses. On a container, for instance, of square cross section, straight ribs of any design may be produced. To make ribs other than horizontal, extensions of the kind of those designated 40, 40' and 41, 41' in FIG. 4 are to be provided which gradually lengthen or become shorter.

The mold shown in FIGS. 5 and 6 consists of two wall sections 53, 53a and a pistonlike part 54. The mold sections are mounted to be horizontally movable. As in the molds of FIGS. 1 and 2, and FIG. 3, the mold sections 53, 53a are provided with opposing cutting edges 55 to pinch shut, for instance, an extruded open-ended tube, an extruded closed-ended bubble, suspending into the open mold space, when the mold closes. The segment thus pinched off is sealed at 55, while the mold sections press-mold a portion of the extruded formation at the free end thereof against a blow pipe 56.

It will be appreciated that in the case of the mold of FIGS. 5 and 6 as in the case of the molds already discussed means other than a blow pipe may be used to inflate the so-called embryo or inflatable product.

The section 53 has a hole 57 in which the part 54 is received for a reciprocal movement in the closing and opening directions of the sections 53, 53a. On blowing the intermediate product in the mold of FIGS. 5 and 6 from an embryo product, material will be expanded into contact with the wall 58 as well as with the wall portions 59 and the part 54, defining the hole 57. The intermediate product is indicated in FIG. 5.

Before the intermediate product is cooled, part 54 which is horizontally movable relative to the section 53 is moved in the direction of the arrow 60 (see FIG. 6) into the position shown in FIG. 6. Thereby, the plastic material 61 that lies against the wall portions 59 and the part 54 will be pressed and welded together to form a formation as shown in FIG. 6, identified by 62. During the movement of the part 54 in the direction of the arrow 60, the material is still under the influence of the pressure fluid used, so that the material lying against the wall portions 59 and the part 54 will not curve into the hole 57 but remain in contact with the defining walls, and will be properly pressed and welded together to form the reinforcing bead 62.

Upon withdrawal of the final article from the mold of FIGS. 5 and 6, the wall portion 63 may be cut out, leaving an apertured cylindrical extension 64 through which the container may be filled. The bead 62 makes it possible to use a removable cover for the cylinder 64, for instance, one made from resilient material, such as plastics, and having an edge member which will undergrip the bead 62. The opening left by the blow pipe 56 may easily be sealed in any suitable way. From FIGS. 5 and 6, it appears that the final article is undercut, having the bead 62 enter a relieved portion of the section 53. However, such undercut causes no difficulties in discharging the final article, due to the elasticity still inherent in the cooled material, so that the usual mechanical or air-blast facilities will suffice to move the bead 62 around the overhanging projection 65. The final article suffers no damage.

It will be obvious that a hole like the one designated 57 may also be provided, turned through 90°, between two mold sections, in which case overhanging portions like the one shown in FIGS. 6 and 7 and there designated 65 will appear in the two opposing mold sections, so that on opening the mold the projections will be withdrawn behind the bead of the final article, and the latter will be entirely free to be discharged.

The mold of FIG. 7 which is somewhat similar to that of FIGS. 5 and 6 consists of two sections 66, 66a and a pistonlike part 67. The sections 66, 66a are supported for horizontal movements toward and from each other. The section 66 has a hole 68 which, as distinguished from the hole 57 in the construction of FIGS. 6 and 7, does not extend horizontally, that is, in the closing and opening directions of the sections 66, 66a, but angularly thereto. The part 67 is mounted to move in the hole 68 back and forth. In FIG. 7, the part 67 is shown in broken lines in the blowing position, and in solid lines in the pressing position. While the mold is in the blowing position, a pressure medium is admitted through the blow pipe 69 to blow an intermediate product. The material will be expanded to lie against the wall portions which define the hole 68, including the face of the part 67, with the latter in the blowing position. Upon blowing, the part 67 is moved into the solid line position, whereby plastic material is pressed together to form the bead 69.

In the final product which is shown in FIG. 7, the wall portion 70 may be cut out to obtain an aperture of sufficient size. The opening left from the blow pipe 69 may be closed by welding.

The containers 71, 71 shown in FIG. 8 are provided with a bottom flange 72 and a top flange 73, the latter having one or more handling or grasping openings 74. The top flange is constructed so as to accommodate the bottom flange, when two containers of the same kind are placed upon each other. Both flanges afford strength, and, in addition, the flange 72 makes sliding of the container on the floor easy. Also, the flanges make it possible to stack the containers, even though they are provided with a closure 75, which closure would otherwise prevent the containers from being stacked. The containers are further provided with diagonally extending ribs 76 which, too, give strength.

The present invention makes it possible to make the containers 71 by blowing, that is, to form the flanges 72 and 73 and the ribs 76 in a single operation. The flanges 72 and 73 are made by providing for a top and a bottom part of a suitable mold to be movable axially of the container cavity, and to be designed to form the flanges by pressing and welding.

In the construction of FIG. 9, the mold sections 77 and 78, on the one hand, and the mold sections 77' and 78', on the other, are mounted to be movable toward and from each other. In addition, the sections 77, 77' and 78, 78' are movable with respect to the other mold parts. Upon blowing the intermediate product 79, the plastic material will lie against the entire cavity wall including the U-shaped grooves 80 and 81. The intermediate product will thus have two dilated portions. Upon moving the sections 77, 77' and 78, 78' toward each other, the material forming the dilated portions in the grooves 80 and 81 will be pressed and welded together to form strengthening ribs 80a and 81a as shown on the final article 79a of FIG. 10.

It should be noted that the conversion of the intermediate product 79 into the final article 79a may also be achieved by providing that the sections 77, 77' and 78, 78' do not move with respect to each other, and arranging, instead, for the mold parts 83 (FIG. 9) to be moved perpendicularly to the plane in which the section of FIG. 9 is taken. Thus, it will be appreciated that a top and bottom mold part as has been mentioned to make the flanges 72 and 73 (FIG. 8) may at the same time be the final article 79a of FIG. 10.

A bottle as shown in FIG. 11 may be produced in a mold as is illustrated in FIGS. 1 and 2. The bottle or final article 84 is provided with a strengthening and the stability of the bottle enhancing bottom bead 84a.

The container 85 of FIG. 12 is provided with a strengthening and greater stability affording bottom bead 86 and a strengthening shoulder bead 87. For the manufacture of the container 85, a mold is used, in which both a bottom and a top part are axially movable with respect to other mold parts.

In FIGS. 13 and 14, a container 88 is shown which is equipped with a bottom ridge 89 and a shoulder flange 90, the latter being apertured at 91, which apertures form handling openings, making it easy to lift the container by hand.

FIG. 15 illustrates a container 92 which is similar to that shown in FIGS. 13 and 14. The container 92 is formed from the finished container or final article of FIGS. 13 and 14 by removal of the rim 90, for instance, by stamping, except for the handles 93.

In order that my invention be fully appreciated, I mention that the flange 90 defining the handle openings 91 (FIGS. 13 and 14) and the handles 93 (FIG. 13) are integrally formed with the respective container itself. It is due to the invention that such integral formation, as well as other formations which give plastic articles the greatest possible strength, can be achieved by blowing and in a single operation.

In FIG. 16, a stack of three containers of the invention is indicated. Each of the identical containers 94 is provided with a bottom flange 95, and a top flange 96 which is apertured at 97 to form handle openings. The bottom flange curves downwardly and is dimensioned to accommodate the top flange of the next lower container without much play, thus making it difficult for stacked containers to tilt and slide with respect to each other, and ensuring safe stacking. The bottom 98 is curved inwardly to avoid the closure 99.

The construction of FIG. 17 combines features of the invention of the copending application Ser. No. 814,088, filed May 18, 1959, now Patent No. 3,004,285, dated October 17, 1961, and features of the present invention. This construction will be readily understood from inspection of the present FIG. 4 and its description and the disclosure of the referred to application Ser. No. 814,088. The mold shown consists of the sections 100, 101, 102 and the complementary sections 100', 101', 102' (not shown). The sections 100 (100') are operated to move downwardly, once the intermediate product has been blown, whereby the extensions 103 (103') cooperate with with the sections 101 (101') to press and weld the material of the dilated portion 104 together. While the sections 100 (100') are moved downwardly, the sections 102 (102') are moved upwardly, so that a cutting action takes place at 105, which cutting separates the material 106 and 107 from the remainder 108. The cutting is effected by the cooperation of the cutting edge 105 and the opposing flat surface 109. A mold of the kind shown in FIG. 17 results in a final article that has a strengthening formation formed from the dilated portion and an opening where there was no opening in the intermediate product.

The article shown in FIG. 18 has the form of a drinking glass and is produced by a mold embodying the features of my copending application and the present application. The opening is obtained from an intermediate product by cutting out the respective material, and the footplate 110 is made by pressing and welding together portions of the intermediate product, which has been converted into the drinking glass type of final article.

The present invention permits the manufacture of hollow plastic articles of any cross section and shape. It will be apparent that any number of strengthening formations of any shape may be provided. Flangelike formations may project in any direction. The flange 90 shown in FIGS. 13 and 14 projects horizontally; the flanges 72 and 73 of FIG. 8 projects downwardly and upwardly, respectively; and the flange 95 of FIG. 16 projects partly horizontally and partly downwardly. My invention makes it also possible to provide a flangelike formation of a shape, when viewed in plan, that differs from the cross-sectional shape of the hollow article. For instance, I provide a round bottle with a generally square or hexagonal bottom flange. Ribs and beads and similar formations may be given any profile, and it is obvious that such riblike or beadlike formations may not only extend in any direction but may be provided in any place as well. For instance, a square bottle could be provided with ribs running along the four vertical bottle edges.

Features of the mold of my present invention permit to be combined with features of the mold of the copending application Ser. No. 814,088, filed May 18, 1959. Such combination may, for instance, be usefully applied to blow an intermediate product having a flaring round outer wall. In converting such intermediate product into the final article, an opening is cut into the intermediate product, and at the same time a bottom flange of square shape is made by pressing and welding. The combined converting actions result in a glass or tumblerlike receptacle having a kind of footplate of angular shape, as shown in FIG. 18.

Thus, it will be clear that while I have shown and described my invention in a few preferred forms only, many changes and modifications may be made without departing from the spirit of the invention defined in the following claims.

I claim:
1. Process for the manufacture of hollow plastic articles, comprising extruding at least a single formation of the plastic material used to suspend vertically, in a condition of plasticity, into the open space between sections of a sectional mold, the mold including at least three sections, closing the mold about at least a single segment of the extruded formation, the closed mold having at least a single cavity conforming in shape to an intermediate product, thereby forming an inflatable product within the closed mold, admitting a fluid pressure medium to the inflatable product, expanding same into molding contact with the mold cavity and forming the intermediate product, relatively moving, before the plastic material has lost its plasticity, at least two mold sections toward each other, with the mold in closed condition and the blown intermediate product within the mold, thereby pressing and welding portions of the intermediate product upon each other and thus converting the intermediate product into the final article, moving said relatively moved together mold sections apart, opening the mold, and withdrawing the final article.

2. In the process according to claim 1, using a mold defining, when closed, at least a single cavity conforming in shape to an intermediate product having at least a single dilated portion, said converting being done in the region of the dilated portion, thus forming by blowing in a single operation the final article having at least a single strengthening formation.

3. In the process according to claim 1 for the manufacture of a bottomed container, using a mold defining, when closed, at least a single cavity conforming in shape to an intermediate product having a dilated portion at the container bottom end, said converting being done in the region of the dilated portion, thus forming by blowing in a single operation the final container having a strengthening bottom formation.

4. In the process according to claim 1 for the manufacture of hollow articles having their main body provided with at least a single strengthening rib, using a mold defining, when closed, at least a single cavity conforming in shape to an intermediate product having at least a single dilated portion on the main body thereof, said converting being done in the region of the dilated portion, thus forming by blowing in a single operation the final container having a strengthening rib.

5. Apparatus for the manufacture of hollow plastic articles by blowing, comprising
 (a) a sectional mold defining, when in blowing position, at least a single composite cavity conforming in shape to an intermediate product having at least a single dilated portion, said cavity having, with respect to adjacent cavity confines, at least a single widened portion and thus yielding said intermediate product,
  (1) said mold including at least three sections adapted to form from the initial plastic material used, on closing said mold, at least a single inflatable product within said mold,
 (b) means to expand said inflatable product to said intermediate product,
  (2) at least two of said mold sections being mounted to be relatively movable toward and from each other, while said mold is in closed condition and the expanded intermediate product is within the closed mold,
  (3) said relatively movable mold sections having opposite face portions, and
 (c) means to impart said relative movement and to cause said face portions, on moving said relatively movable mold sections toward each other, to assume a contiguous relationship and to sandwich wall parts of said dilated portion therebetween, thereby pressing and welding said wall parts upon each other and converting said intermediate product into a final article having at least a single strengthening formation.

6. In the apparatus according to claim 5 for the manufacture of a bottlelike container, said cavity having a bottle bottom end and a bottle neck end and being closed except for a single opening at said neck end, said mold including two pairs of sections, said expanding means including hollow blowing means passing through said opening to admit an inflating medium, the mold sections of one of said pairs and the mold sections of the other pair being relatively movable toward and from each other, one of said pairs of mold sections being arranged at said bottom end, said opposite face portions being provided on the sections of both of said pairs and helping convert said intermediate product into a bottle having a strengthening bottom formation.

7. In the apparatus according to claim 5, said cavity having at least two widened portions and yielding an intermediate product having at least two dilated portions, said mold including a first pair of sections and two additional pairs of sections, the sections of said first pair and the sections of each of said two additional pairs being relatively movable toward each other, said opposite face portions being provided on the sections of said first and two additional pairs and helping convert said intermediate product into a final article having at least two strengthening ribs.

8. In the apparatus according to claim 7, the sections of said first pair being mounted to be movable between the sections of said two additional pairs.

References Cited in the file of this patent
UNITED STATES PATENTS

| | | |
|---|---|---|
| Re. 23,564 | Hobson | Oct. 14, 1952 |
| 2,099,055 | Ferngren | Nov. 16, 1937 |
| 2,349,177 | Kopitke | May 16, 1944 |
| 2,830,721 | Pinsky et al. | Apr. 15, 1958 |
| 2,836,319 | Pinsky et al. | May 27, 1958 |
| 2,887,716 | Crosio | May 26, 1959 |
| 2,908,034 | Hackett | Oct. 13, 1959 |
| 2,913,762 | Knowles | Nov. 24, 1959 |
| 2,951,264 | Bailey | Sept. 6, 1960 |
| 3,004,285 | Hagen | Oct. 17, 1961 |